US006272345B1

(12) United States Patent
Worger et al.

(10) Patent No.: US 6,272,345 B1
(45) Date of Patent: Aug. 7, 2001

(54) METHOD AND APPARATUS FOR REGION BASED HAND-OFFS IN A SATELLITE COMMUNICATION SYSTEM

(75) Inventors: William R. Worger, Gilbert; Craig Long, Mesa; Ernest E. Woodward, Chandler, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/126,647

(22) Filed: Jul. 31, 1998

(51) Int. Cl.⁷ ...................................................... H04Q 7/38
(52) U.S. Cl. ......................... 455/436; 455/12.1; 455/428; 455/430
(58) Field of Search .................................. 455/436, 12.1, 455/437, 439, 440, 443, 428, 430

(56) References Cited

U.S. PATENT DOCUMENTS

| 5,109,528 | 4/1992 | Uddenfeldt | 455/33.2 |
|---|---|---|---|
| 5,161,248 | * 11/1992 | Bertiger et al. | 455/17 |
| 5,483,664 | 1/1996 | Moritz | 455/13.1 |
| 5,561,838 | * 10/1996 | Chandos et al. | 455/13.1 |
| 5,621,415 | 4/1997 | Tuck | 342/354 |
| 5,625,867 | 4/1997 | Rouffet et al. | 455/13.1 |
| 5,669,061 | * 9/1997 | Schipper et al. | 455/429 |
| 5,736,959 | 4/1998 | Patterson et al. | . |

* cited by examiner

*Primary Examiner*—Lee Nguyen
(74) *Attorney, Agent, or Firm*—Jennifer B. Wuamett; Timothy J. Lorenz; Frank J. Bogacz

(57) ABSTRACT

A method (300, FIG. 3) controls CU (140, FIGS. 1, 6) hand-off in a non-geostationary orbit (NSGO) satellite system (100, FIG. 1) without consuming large amounts of bandwidth or satellite processing power. Using method (300), a network control facility (NCF) (130, FIGS. 1, 5) divides the earth (102, FIG. 2) into suitable regions 200 (FIG. 2), or geographical areas of the earth sized so that all of the CUs (140, 142, 144, FIG. 1) within a region (200) can be handed-off as a group rather than handling each station individually. When it is determined through the method (300) that it is time to hand-off communications in a particular region, all CUs within that region are directed to effectuate a hand-off at substantially the same time.

4 Claims, 4 Drawing Sheets

METHOD AND APPARATUS FOR REGION BASED HAND-OFFS IN A SATELLITE COMMUNICATION SYSTEM

FIELD OF THE INVENTION

This invention relates generally to the field of communication systems. More specifically, this invention relates to handing-off communications or traffic in a satellite communication system.

BACKGROUND OF THE INVENTION

A cellular communication system projects a number of "beams" or "cells" over the earth. A communication unit (CU) communicates within a cell containing multiple channels. Channel access is allocated by frequency, time, by coding, or by a combination of frequency, time, and/or coding to the cells of the system such that communications occurring in adjacent cells use different channels to minimize the likelihood of interference between channels. Over a large pattern of cells, channels can be reused repeatedly by distributing common channels over the entire cell pattern such that only non-adjacent cells reuse the same channels.

A non-geostationary orbit (NGSO) mobile satellite system employing satellite-fixed cells must address the motion of satellite antenna cell coverage areas relative to the CUs. In this context, a "cell" or "beam" is defined as the coverage area formed on the earth's surface by a single antenna beam, and a satellite "footprint" is defined as the aggregation of all cells or beams formed by the antennas of a single satellite. Satellite cells sweep over the earth's surface at such a high rate of speed that a given CU is moved through a number of beams or cells during the course of a particular communication. Frequently, a CU could be serviced not only by multiple cells or beams of a single satellite, but also by two or more different satellites during the course of the communication.

As a satellite moves in its orbit, it becomes necessary to hand-off communications or traffic with each CU in a first cell to different cells within a satellite footprint and ultimately to cells of a footprint of an adjacent satellite. In prior art systems, individual CUs generally are handed-off individually requiring at least two messages for handing-off each CU, one for the CU to request to be handed-off, and a second for the satellite to grant the hand-off. The need for processing multiple messages from multiple CUs during hand-offs consumes substantial amounts of bandwidth and satellite processing power in the satellite communication system.

Thus, what is needed is a method and apparatus to control CU hand-offs of communications or traffic in a NGSO satellite communication system without consuming substantial amounts of bandwidth and/or satellite processing power.

BRIEF DESCRIPTION OF THE DRAWINGS

The invention is described below with particularity in the appended claims. However, other features of the invention will become more apparent and the invention will be best understood by referring to the following detailed description in conjunction with the accompanying drawings, in which like reference designators are used to designate like elements, and in which:

Figure 1:
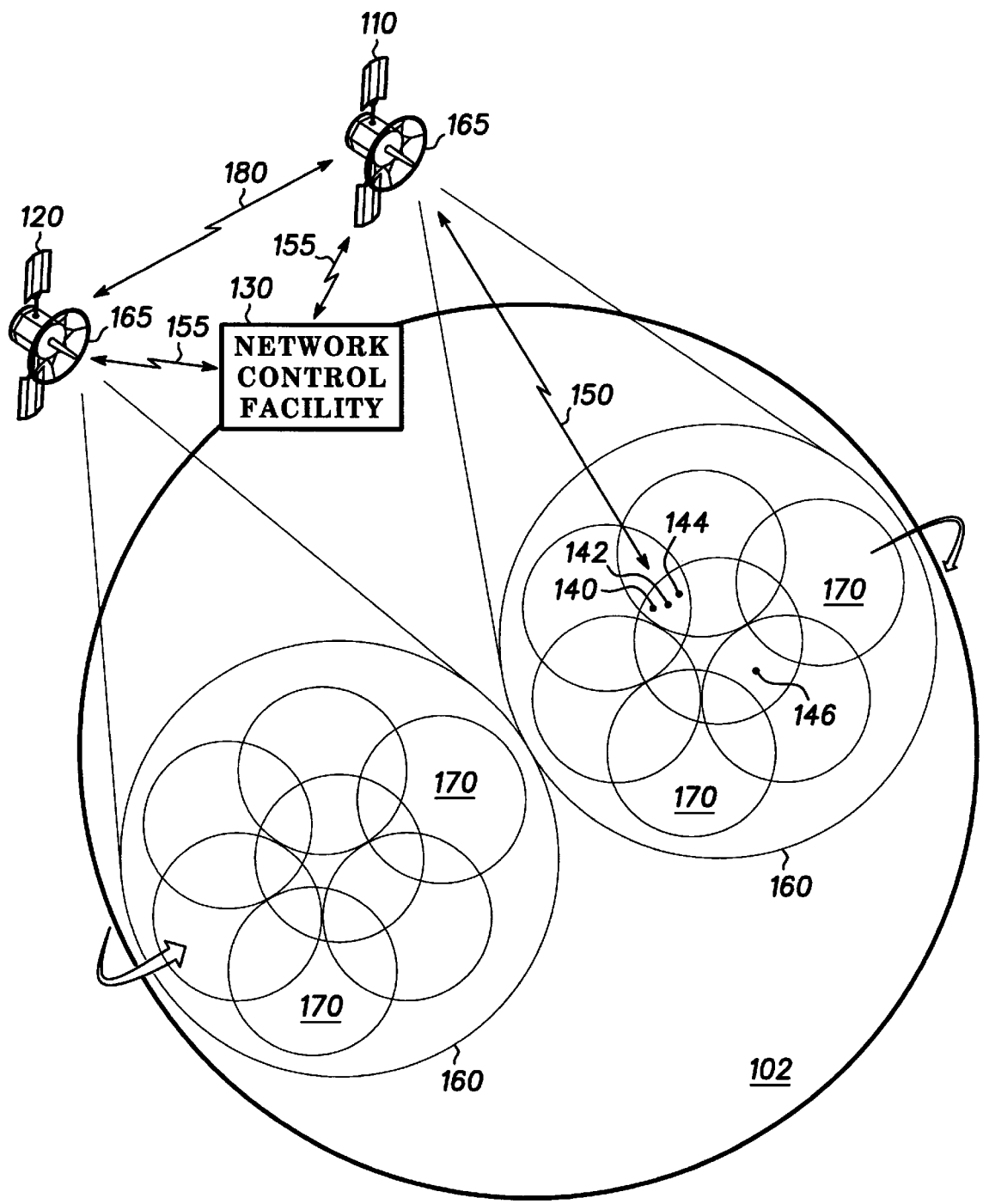
FIG. 1 illustrates a highly simplified diagram of a portion of a satellite communication system 100 in accordance with a preferred embodiment of the present invention.

The exemplification set out herein illustrates a preferred embodiment of the invention in one form thereof, and such exemplification is not intended to be construed to be limiting in any manner.

DETAILED DESCRIPTION OF THE DRAWINGS

The present invention provides a method and apparatus for region-based hand-offs in a satellite communication system. The present invention addresses the problem of controlling CU hand-off in a non-geostationary orbit (NSGO) satellite system without consuming large amounts of bandwidth or satellite processing power. The invention utilizes the concept of a dividing the earth into "regions". A "region" is defined herein as a geographical area of the earth which is sized so that all of the CUs within the region can be handed-off as a group rather than handling each station individually. In a preferred embodiment, the size of a region is governed by the amount of overlap between beams of the satellite because in a preferred embodiment, a region is covered simultaneously by two beams to facilitate hand-offing off all CUs within a region as a group.

When it is determined that it is time to hand-off communications in a particular region, all CUs within that region are directed to hand-off communications simultaneously, or substantially simultaneously. This substantially simultaneous group hand-off could be effectuated by having a satellite (or some other node of the system) broadcast or transmit a single message directing each CU in the region to move to a new beam, frequency or time slot or a combination thereof. Alternatively, the region-based hand-off could be initiated in response to pre-programmed hand-off times available to all CUs in the region. Thus, it is an advantage of the present invention that all of the CUs in a region are handed-off as a group using a single message. This is in contrast with prior art methods and systems where each individual CU is handed off as a unit requiring at least two messages for each station, one for the CU to request to be handed-off, and a second for the satellite to grant the hand-off.

A further advantage of the method and apparatus of the present invention is that the present invention enables satellites to make decisions about hand-offs, reducing the amount of processing required by the satellite as compared with handling each station individually. This is achieved by performing hand-offs by simple switching of radio frequency (RF) channels from beam to beam or by switching modem channels from beam to beam, as described in further detail below with reference to FIGS. 3–4.

It is a further advantage of the present invention that hand-off times and calculations used to effectuate hand-offs can be predetermined on the ground and uploaded to the satellite for execution or pre-programmed within the CUs. Pre-determining the hand-off process reduces the amount of processing power required within the satellite, thus reducing size and weight of the satellite and the power consumed by the satellite.

FIG. 1 illustrates a highly simplified diagram of a portion of a satellite communication system 100 in accordance with a preferred embodiment of the present invention. System 100 includes at least one satellite 110. For clarity, FIG. 1 illustrates only two satellites 110, 120 although any number of satellites could be included in system 100. While the present invention is advantageously employed when a large number of satellites are being used in a constellation, it is also applicable with as few as a single satellite. System 100 also includes at least one Network Control Facility (NCF) 130 and at least one communication unit (CU) 140. Additional CUs 142, 144, and 146 also are shown.

In general, satellites 110 and 120, CUs 140, 142, 144, and 146, and NCF 130 of communication system 100 could be viewed as a network of nodes. Each node of communication system 100 is or could be in data communication with other nodes through communication links. Additionally, all nodes of communication system 100 are, or could be, in data communication with other communication devices dispersed throughout the world through public switched telephone networks (PSTNs) and/or conventional terrestrial communication devices coupled to a PSTN through conventional terrestrial facilities.

CUs 140, 142, 144, and 146 could be located anywhere on or below the surface of the earth or in the atmosphere above the earth's surface. Each CU 140, 142, 144, and 146 is preferably a communication device capable of transmitting data and/or voice to, and receiving data and/or voice from, satellites, such as satellites 110 and 120 and/or other nodes of the system. By way of example, CUs 140, 142, 144, and 146 could be a computer or other devices capable of sending and receiving data, e-mail messages, video signals or facsimile signals, to name a few. Alternatively, CU 140, 142, 144 and 146 could be a hand-held cellular telephone adapted to transmit and receive communications from satellites 110 and 120 and/or from one or more other nodes, such as NCF 130. In a preferred embodiment of the present invention, CUs 140, 142, 144, and 146 are stationary or move at negligible speeds in comparison to satellites 110 and 120.

In the exemplary configuration shown in FIG. 1, satellites 110 and 120 communicate with CUs 140, 142, 144, and 146 over a communication link, such as communication link 150 between CU 140 and satellite 110. Links 150 typically are established after a CU 140, 142, 144, or 146 requests service from a satellite such as satellite 110 or 120. How CU 140, 142, 144 and 146 physically transmit and receive data and/or voice from satellite 110 is well known to those of ordinary skill in the art.

Satellite 110 also communicates with NCF 130 over link 155. NCF preferably receives telemetry from satellite 110 and controls operation of satellite 110. How NCF 130 communicates with satellite 110 is well known to those of skill in the art. Additional satellites such as satellite 120 also could communicate with NCF 130. In a preferred embodiment, NCF 130 could be a terrestrial station made up of one or more components located anywhere on the surface of the earth or in the atmosphere above earth 102. There could be multiple other NCFs (not shown) in different locations. In addition to communicating with satellites 110 and 120, NCF 130 also can communicate with CUs 140, 142, 144, and 146.

Satellites 110 and 120, in a preferred embodiment, communicate with each other and/or with other nearby satellites (not shown) through inter-satellite links 180. Thus, a communication from a CU, such as CU 140, located at any point on or near the surface of the earth could be routed through a constellation of satellites, including satellites 110 and 120, to within range of substantially any other point on the surface of the earth. A communication could be routed down to a CU, such as CU 140, on or near the surface of the earth from satellite 110 using a communication link 150. Alternatively, a communication could be routed down to or up from any one of many earth terminals (not shown), as inter-satellite links are not necessary in the present invention.

FIG. 1 also illustrates a satellite footprint pattern or antenna pattern 160 formed on the surface of the earth by a satellite. Satellites 110 and 120 desirably include multibeam, directional antennas 165. Each antenna 165 projects numerous discrete antenna beams toward the earth's surface at numerous diverse angles to form an equal number of discrete cells or beams 170. In a preferred embodiment of the present invention, satellites 110 and 120 and other satellites (not shown) form other similar footprints (not shown), desirably creating a continuous blanket of cells 170 substantially covering the surface of the earth 102.

Those skilled in the art will appreciate that multiple cells or beams 170 formed by antenna 165 define a geometry and do not imply a particular direction of communication. In other words, communications could be transmitted and/or received through beams 170 projected by antennas 165 toward the earth's surface. Other antennas (not shown) on satellites 110 and 120 extend communications to other satellites (not shown) and/or NCFs 130 and earth terminals (not shown). For convenience, FIG. 1 illustrates cells or beams 170 and footprints 160 as being discrete, generally circular shapes without overlapping regions. However, one skilled in the art will understand that in actual practice, cells or beams projected from the satellite could take on other shapes and could, for example, be elliptic, hexagonal, rectangular or square. Additionally, in a preferred embodiment of the present invention, antenna 165 is adapted to provide beams that have significant overlapping regions, as shown and described in further detail with reference to FIG. 2.

Figure 2:
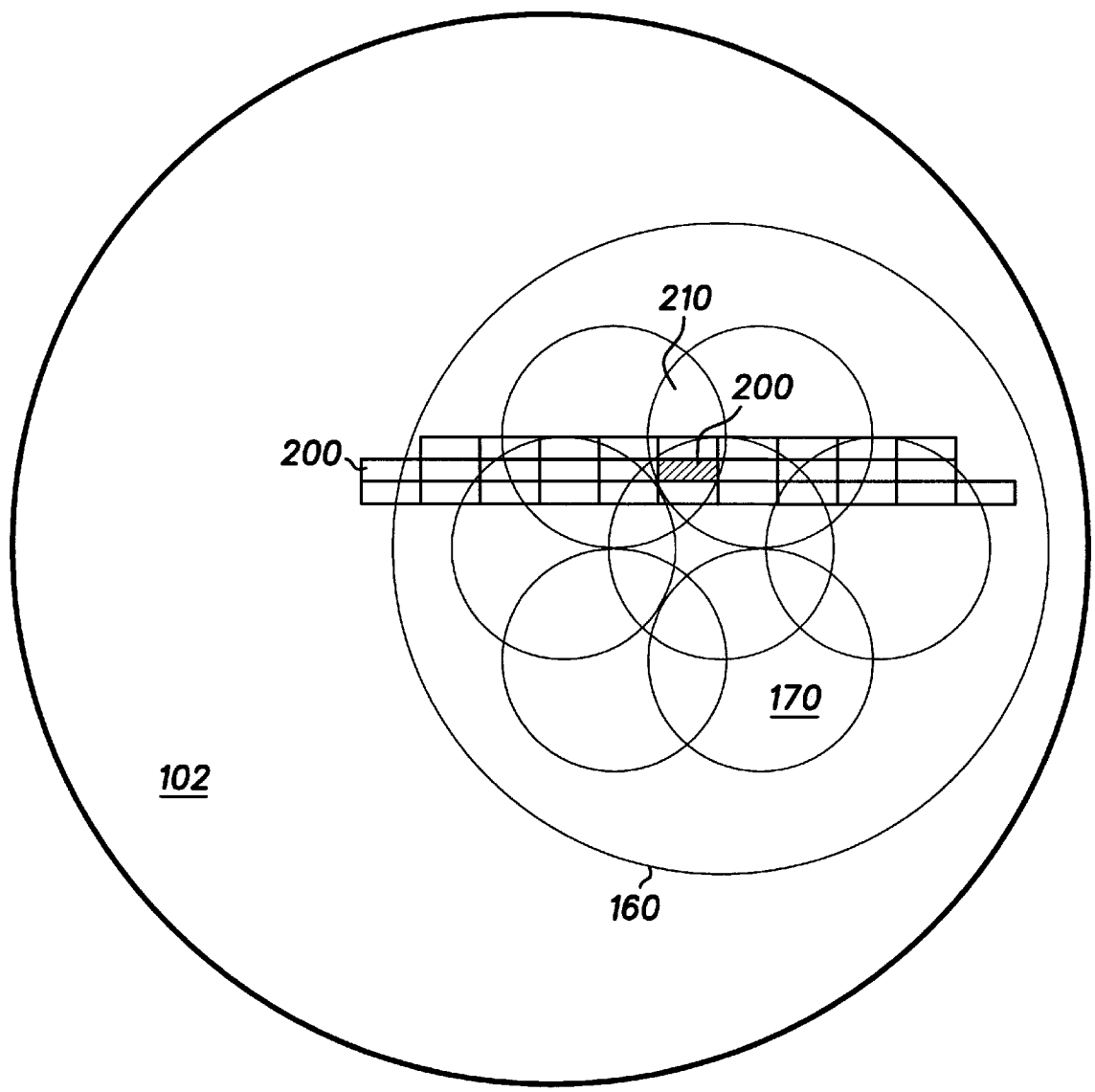
FIG. 2 illustrates a plurality of regions in relation to the earth and to a satellite footprint in accordance with a preferred embodiment of the present invention.

FIG. 2 illustrates a plurality of regions 200 in relation to the earth 102 and to a satellite footprint 160 in accordance with a preferred embodiment of the present invention. In system 100 (FIG. 1), satellites 110 and 120 are constantly moving relative to the earth. Thus, it becomes necessary to hand-off communications or traffic between cells or beams 170 and/or between hardware items associated with one or more satellites. Within a footprint 160, overlapping beams or cells 170 are projected onto the surface of the earth. FIG. 2 illustrates satellite footprint 160 having multiple beams or cells 170 and also a plurality of regions 200 into which a particular area of the earth 102 has been divided.

A region 200 is defined herein to comprise a geographical area of the earth which is of a size selected so that all of the CUs within a region can be handed-off as a group as opposed to handling each station individually. In a preferred embodiment, a region is further defined as an area corresponding to an area on the earth which is small enough to fit within beam overlap area 210 so that all CUs located within the region can be handed-off simultaneously.

For example, in FIG. 1 CUs 140, 142 and 144 are located in close geographic proximity to each other within a cell 170 of footprint 160 of satellite 110. The geographic proximity of CUs 140, 142, and 144 can make it possible for all three of these CUs to be assigned to a region in accordance with a preferred embodiment of the present invention so that CUs 140, 142, and 144 can be handed-off simultaneously as a group residing within a particular region rather than handling hand-off of each CU individually.

Figure 3:
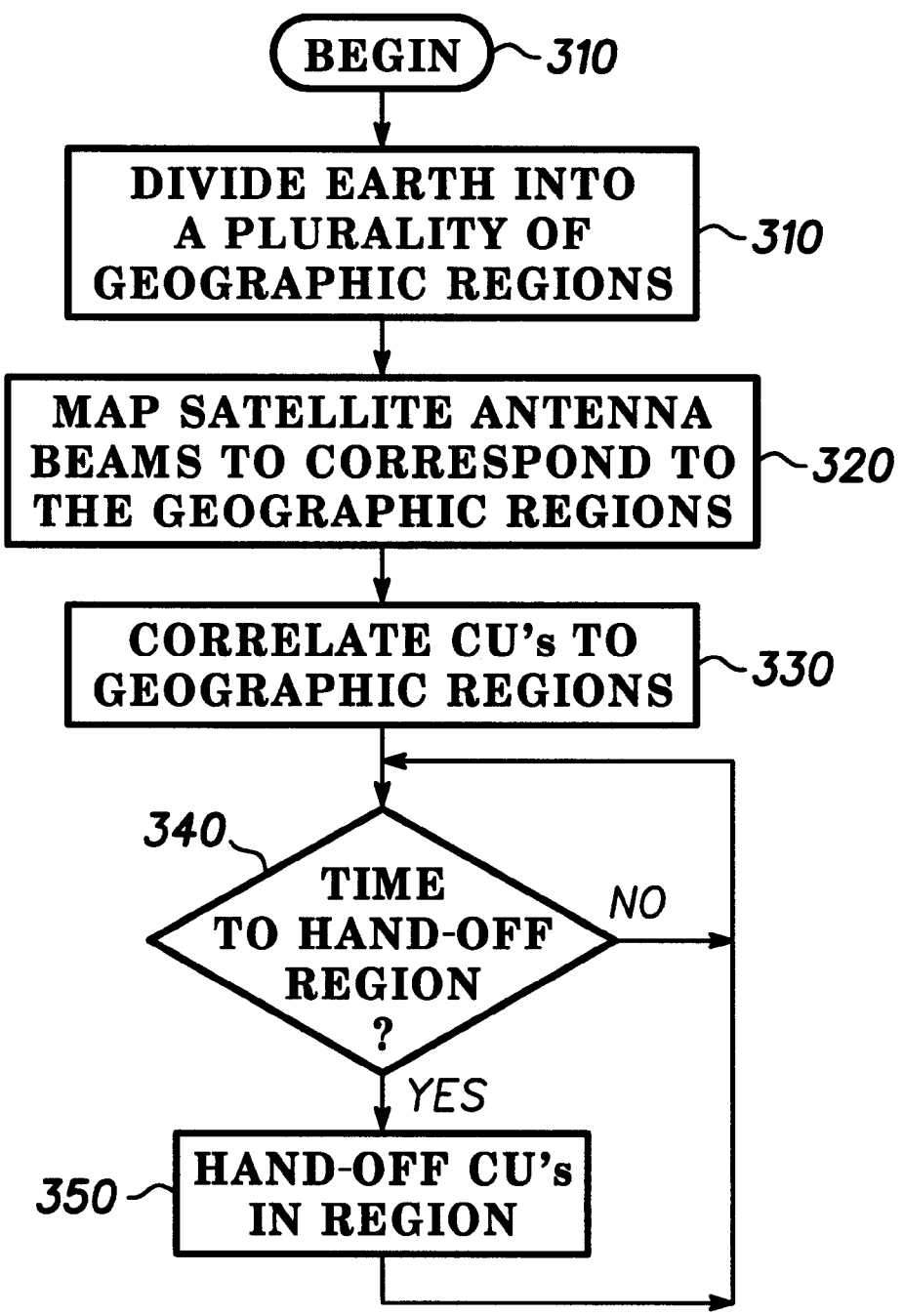
FIG. 3 illustrates a flow diagram of a method for handing-off CUs in a satellite communication system in accordance with a preferred embodiment of the present invention.

FIG. 3 illustrates a flow diagram of a method 300 for handing-off CUs in a satellite communication system, such as communication system 100, in accordance with a preferred embodiment of the present invention. Method 300 begins in step 305.

In step 310, the earth is divided into a plurality of regions 200 (FIG. 2). As noted above, a region comprises a geographical area of the earth which is of a size selected so that all of the CUs within said geographical area can be handed-off as a group. More specifically, the size of a region is determined at least in part by a size of an area of overlap between one or more beams projected by one or more satellites. In a preferred embodiment, the size of a region is defined as an area corresponding to an area on the earth which is small enough to fit within said area of overlap.

Step 310, desirably is performed by a control facility of the system, such as NCF 130 of system 100, but step 310 also could be performed by one or more other nodes of system 100 or by a combination of nodes. In a preferred embodiment, all regions for all areas of coverage of the satellite system on the earth are of the same size, however, this is not necessary in the present invention. In alternate embodiments, the size of the regions can be adjusted in particular geographic locations on the earth to ensure that all regions will be covered by two beams prior to hand-off. Desirably, the size of the region is determined by one or more of multiple factors including, for example, the number of beams projected by the satellites, the size of the beams, how accurately the beams can be placed, and the size of the area of overlap between beams. In a preferred embodiment, the regions are selected to be as large as possible while still being small enough to fall within the area of overlap of two beams prior to hand-off, as increased region size provides the ability to engage in simultaneous hand-off of larger numbers of CUs in a region.

In step 320, satellite antenna beams are mapped to correspond to earth-based regions 200. Step 320 of method 300 desirably is performed by one or more satellites 110 (and/or 120) in system 100. Alternatively, mapping can be performed by one or more other nodes of system, such as NCF 130 (FIG. 1), for example. Satellites 110 receive information from system 100 (and desirably from NCF 130) informing satellites 110 of the location of regions 200 on the earth.

In a preferred embodiment, satellites 110 know where their beams are directed with respect to the earth and therefore can determine which regions 200 will be illuminated by their beams at a particular time. For example, satellites 110 can map their antenna beams to correspond to the earth-based regions by predicting where their beams will project on the earth-based on knowledge regarding the satellites' location above the earth and the geometry of their antenna configuration. Alternatively, system 100 could assign specific ground-based facilities to monitor the projection of beams of various satellites with respect to the earth and to inform the satellites as to precisely where their beams are projected. In a preferred embodiment, satellite antenna beam mapping occurs in real time. In alternate embodiments, mapping of satellite antenna beams can be done on a predetermined, non-real time basis, such that expected antenna beam patterns are predicted and then periodically updated. This information can be used to pre-program processors within the CUs to effectuate hand-offs at predetermined times without receiving specific instructions to do so from other nodes of system 100.

In step 330, CUs are correlated to appropriate regions. More specifically, CUs, such as CUs 140, 142, and 144 (FIG. 1) are placed logically within an appropriate region based on their geographic location on the earth. In a preferred embodiment, step 330 is executed as an internal process within each CU based on geolocation (or similar) information available to CUs and also based on or more region-based maps available to the CUs. Such map(s), which identifies the region-based divisions made in step 310, can be pre-programmed in the CUs or can be broadcast or transmitted to the CUs from one or more NCFs in real-time or near real-time.

In step 340, a satellite projecting beams within a first region of the earth determines whether it is time to hand-off one or more of said CUs associated with the first region (and/or with other regions services by the satellite). Satellites 110 do not need to receive any information from the CUs themselves to determine whether a hand-off is needed. Rather, in a preferred embodiment satellites determine which beams are covering which region(s) at a particular time and analyze such information, in conjunction with information concerning the position and direction of the satellite, to determine when a hand-off will be needed. In alternate embodiments, other nodes of the system can analyze similar information to determine when to initiate a hand-off of a region. Note that although method 330 is described to include a satellite determining whether it is time to execute a hand-off in a first region, any number of satellites and/or other nodes of the system can execute method 300 simultaneously or substantially simultaneously with respect to multiple regions associated with such satellites, and the present method is not required to be executed for one region at a time.

If, in step 340, the satellite determines that it is not time to execute a hand-off, the method will repeat step 340 until a determination is made that it is time to execute a hand-off. When a determination is made that it is time to execute a hand-off, then in step 350, all CUs within the region where the hand-off is to occur (referred to herein as a "group" of CUs) will be directed to engage in a hand-off. Communications or traffic associated with the CUs of the group associated with a region, such as a first region, are handed-off simultaneously or substantially simultaneously.

Initiation and execution of hand-offs in a region can occur in several ways. In a first embodiment hand-offs are effectuated by the CUs based on directions included in a single message sent by the satellite to all CUs in the region to be handed off, such as the first region. The CUs from the first region will then be handed off to another cell or beam covering the region. In alternate embodiments, hand-off directions can be received from one or more other nodes of the system or can be pre-programmed in the CUs. Where the directions are pre-programmed in the CUs, specific hand-off times and instructions for how to hand-off communications or traffic desirably are included in the instructions.

The hand-off directions could be to execute a hand-off to another beam or cell associated with the same satellite, or the direction could be for a losing satellite (e.g., the satellite which is moving away from the CUs) directing the CUs to hand-off to a beam of a gaining satellite (e.g., a satellite moving toward the CUs) which is covering the same region as a beam of the losing satellite.

For example, assume that the system (either through a satellite 110 or a NCF 130) has determined that it is time to move all CUs in a region to a new beam and frequency. To initiate the hand-off in a first embodiment the satellite broadcasts a message to all CUs in a particular region indicating that a hand-off is required at a certain time. This broadcast message could, for example, say something to the following effect: "All CUs in region A move from Beam 1, Satellite 7, Frequency 6 to Beam 6, Satellite 8, Frequency 9 at time 10:00.0." At time 10:00.1, all CUs then make appropriate internal adjustments to effectuate the hand-off to beam 6 on satellite 8 using frequency 9. In alternate embodiments, a similar message could be sent to the CUs from another node of the system or could be pre-programmed in the CUs.

The present invention overcomes the problems of handling of CUs on an individual unit basis for hand-offs. In certain instances, it may be desirable to have an individual CU be handled separately from the region-based grouping. For example, such individual handling may be desirable to address interference and/or communication quality issues. In the case where a CU is handled individually, the CU is either moved to a new region (given geography is acceptable) or is handled as an individual unit using a standard request-grant process until that station is able to become part of the region again.

In a preferred embodiment of the present invention, a significant amount of the hand-off processing can be pre-calculated on the ground and loaded up to the satellites via one or more tables to be executed at a specific time. The ability to achieve this increased efficiency arises, at least in part, because the satellite can control the hand-off of the CUs, and the path of the satellites over the earth is predictable. Thus, ground based nodes of the system, such as NCF 130 of system 100, can compute at what time each region will need to be handed-off by computing the time that the region will be completely covered by the losing and gaining beams. The ground-based node can then send this set of hand-off times to the satellite hours or days before the hand-offs actually occur. Alternatively, the hand-off times can be pre-programmed into the CU. The processing that the satellite performs, in a preferred embodiment, is simply to read the table(s) sent by a ground-based node, issue the hand-off broadcast prior to the time specified in the table(s), and switch the RF resources at the time specified in the table(s). The structure of a satellite capable of achieving increased efficiency resulting from use of the method of the present invention is discussed in further detail below with respect to FIG. 4.

Figure 4:
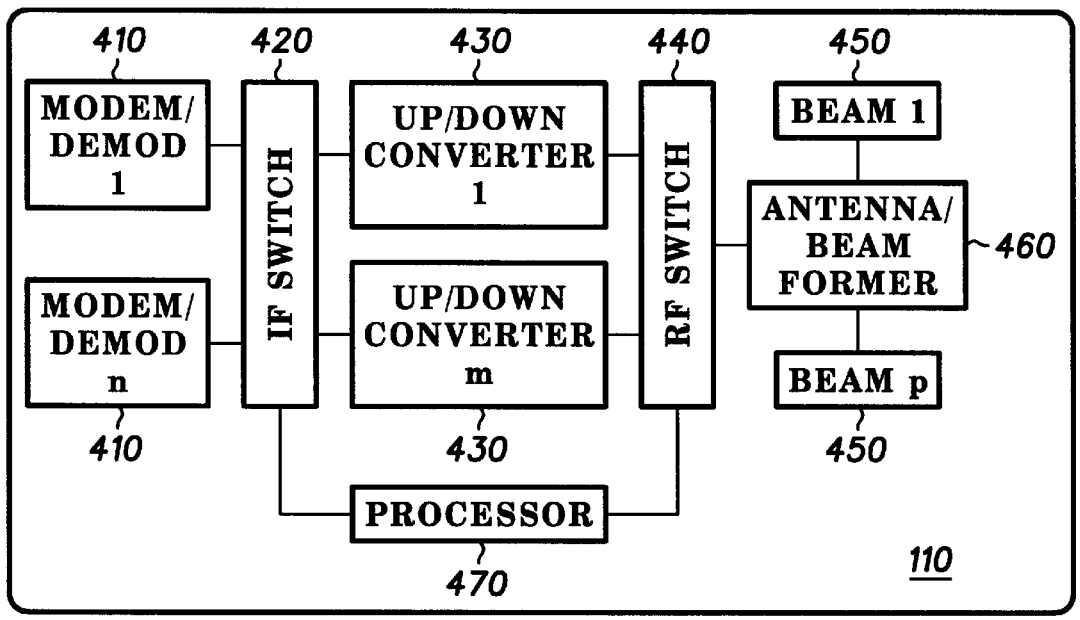
FIG. 4 illustrates a simplified block diagram of a satellite payload in accordance with a preferred embodiment of the present invention.

FIG. 4 illustrates a simplified block diagram of a satellite payload in accordance with a preferred embodiment of the present invention. Satellite 110 includes RF hardware elements used to place data within beams of the satellite and capable of executing, at least in part, steps 320, 340, and 360 of method 300 (FIG. 3). For example, satellite 110 includes one or more modems/demodulators (demods) 410 (hereinafter referred to simply as "modems") which are used to encode and/or decode data for a specific CU. Satellite 110 also includes one or more switches (420, 440) capable of connecting the hardware elements to each other and of connecting the hardware elements to one or more antenna/beam former elements 460. More specifically, satellite 110 includes at least one intermediate frequency (IF) switch 420, which allows the system to switch any modem to any of one or more up/down converters 430 as appropriate. A set of up/down converters 430 serve to convert baseband modem signals into RF signals and/or to convert RF signals to baseband modem signals as appropriate, depending on the direction of flow of the traffic (e.g., whether traffic is flowing to or from the satellite). RF switch 440 allows any up/down converter 430 to be connected to any of multiple satellite beams 450 which emanate from the satellite through antenna/beam former 460.

Satellite 110 also includes at least one processor 470 capable of determining when it is time to hand-off a plurality of CUs associated with an earth-based region (e.g., region 200, FIG. 2) being serviced by the satellite and capable of initiating a hand-off by generating a hand-off message to be sent to substantially all of said CUs associated with said earth-based region, wherein in response to the hand-off message the CUs effectuate hand-offs substantially simultaneously. The satellite payload structure described above enables hand-offs to be performed using any one of multiple possible methods, including, for example, handing-off a CU to a different modem, handing-off a CU to a different frequency, handing-off a CU to a different beam, handing-off a CU to a different satellite, or any combination of the above.

Hand-off processing is substantially reduced for the various hand-off types when all of the CUs in a region are handed-off as a group under the direction of satellite 110 using method 300. For example, when using method 300 to hand-off CUs to a different frequency, the entire group of CUs within a particular region can be moved to a new frequency in the satellite simply by broadcasting the hand-off request to the CUs to indicate a change in the frequency and then changing the up/down converter 430 frequency to the new frequency at the appropriate time. Within the satellite, the processing required for the hand-off is simply to broadcast the hand-off message and change the up/down converter 430 frequency. To achieve the benefit of this reduced processing load, the satellite attaches all of the modems/demods 410 for the CUs in a specific region to a single up/down converter 430 so that all CUs in the region can be switched to the new frequency simply by changing the one up/down converter 430.

In another example, method 300 also can be used to effectuate a hand-off of all CUs in a region from a first beam to a second, different beam. A group of CUs can be switched to a new beam by changing RF switch 440 so that the up/down converter 430 handling the group of CUs associated with the region to be handed-off is moved from the first (losing) beam to the second (gaining) beam. The processing employed by the satellite to perform the hand-off is simply to change the RF switch. No broadcast is required to be sent to the CUs in this example. Again, to the benefit of saving of processing power in the satellite hand-off, the satellite assigns all CUs in the region to be handed-off to the same up/down converter 430 so that the output of that up/down converter can be switched to a new beam.

Figure 5:
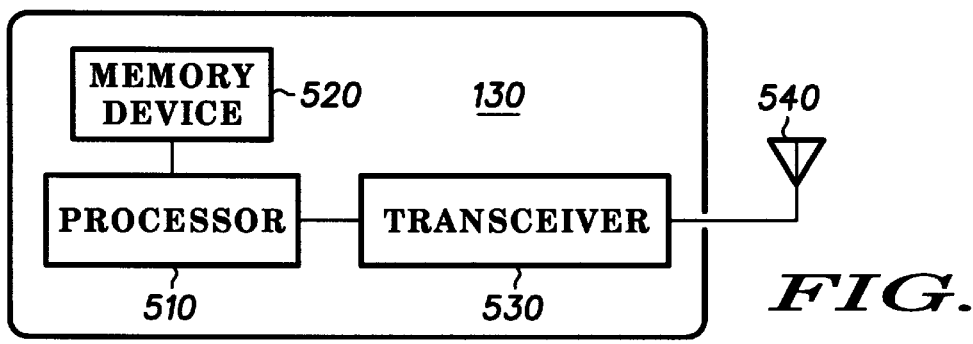
FIG. 5 illustrates a simplified block diagram of a network control facility in accordance with a preferred embodiment of the present invention.

FIG. 5 illustrates a simplified block diagram of a network control facility (NCF) 130 in accordance with a preferred embodiment of the present invention. NCF 130, in a preferred embodiment of the present invention, includes hardware and software adapted to execute steps 310 and 340 of method 300. NCF 130 includes at least one processor 510 coupled to associated memory device 520 (e.g., random access memory or RAM, other semiconductor or magnetic read-write memory devices, optical disk, magnetic tape, floppy disk, hard disk, etc.). NCF 130 also includes antenna 540 coupled to transceiver 530, which also is coupled to processor 510.

In a preferred embodiment, NCF includes means capable of determining a suitable size for a region and of dividing the earth into a plurality of regions, and means for determining whether it is time to hand-off one or more of said CUs associated with a first region (or other regions). More specifically, processor 510 is capable of determining a suitable size for a region and of dividing the earth into a plurality of regions. Processor 510 determines a suitable size for regions either on a real-time (or near-real time) or a predetermined time basis through analysis of information available to it regarding the size of the area of overlap of satellite beams in various areas of the earth at various times. Processor 510 stores information needed to make this determination in memory device 520. Processor also is capable of dividing the earth into a plurality of regions and producing a map or table identifying such regions.

Such map or table desirably is stored in memory device 520 and also can be broadcast or transmitted to CUs of system 100 in real-time (or near-real time) or at predetermined time intervals, as desirable, by transceiver 530 through antenna 540. In alternate embodiments, the functions described with respect to processor 510 above can be performed by, or in cooperation with, one or more other nodes of system 100 (FIG. 1).

Figure 6:
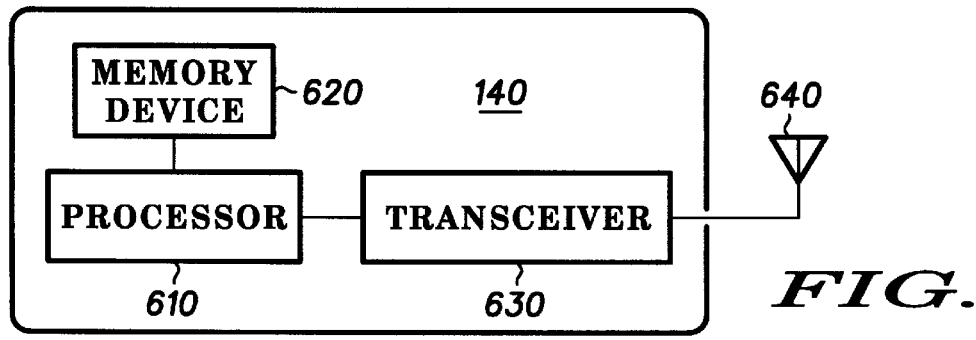
FIG. 6 illustrates a simplified block diagram of a communication unit (CU) in accordance with a preferred embodiment of the present invention.

FIG. 6 illustrates a simplified block diagram of a CU in accordance with a preferred embodiment of the present invention. CU 140 (and likewise CUs 142, 144, and 146 of FIG. 1), in a preferred embodiment of the present invention, includes hardware and software adapted to execute, at least in part, steps 330 and 360 of method 300. CU 140 includes at least one processor 610 coupled to associated memory device 620 (e.g., random access memory or RAM, other semiconductor or magnetic read-write memory devices, optical disk, magnetic tape, floppy disk, hard disk, etc.). CU 140 also includes antenna 640 coupled to transceiver 630, which also is coupled to processor 610.

In a preferred embodiment, CU 140 includes means capable of enabling the CU to correlate itself to the appropriate earth-based region of the plurality of regions into which the earth has been divided. More specifically, CU 140 knows its location (e.g., through geolocation processes executed at least in part by the CU or communicated to the CU), and processor 610 is capable of examining a region-based map (not shown), preferably residing in memory device 620, to determine to which region it belongs based on the CU's location. The region-based map could be pre-programmed into the CUs or could be broadcast or transmitted to the CUs on a real-time (or near real-time) basis or on an intermittent basis.

In a first embodiment, CU 140 also includes means for receiving a message directing hand-off and for executing the hand-off message in accordance with instructions contained therein. More specifically, transceiver 630 is capable of receiving a hand-off message sent by a satellite 110 or other node of system 100 (FIG. 1), and processor 610 is capable of processing the message and executing the directions contained in the message (e.g., switching communications to the appropriate frequency, beam, and/or satellite) to effectuate the hand-off in accordance with the message.

In an alternate embodiment, CU 140 includes means for automatically effectuating a hand-off on a predetermined basis. In this embodiment, a hand-off could be effectuated without necessarily receiving a hand-off message from a satellite or other node of the system. Rather processor 610 is capable of analyzing pre-programmed hand-off instructions and times residing in memory device 620 and of initiating the hand-off in accordance with the pre-programmed instructions.

In summary, a method and apparatus for handing-off communications or traffic in a satellite communication system including at least one satellite and a plurality of communication units (CUs) has been described in detail herein. The method and apparatus of the present invention allows multiple CUs to be handed-off as a single group within an earth-based region thereby substantially reducing the amount of RF traffic and satellite processing resources needed to complete a hand-off. The method and apparatus of the present invention enable the satellites of a NGSO satellite communication system to take advantage of the structure of the satellite beams and also the frequencies used by the satellite to communicate with CUs thus allowing groups of CUs to be handed-off simply by moving an RF channel to a new beam, moving a modem set to a new beam, or the like. Thus, hand-offs can be performed largely using ground-based processing rather than on-board processing in the satellite. The resulting decrease in complexity of the satellite and lightened processing burden on the satellite enables satellites to be made lighter and less expensive.

While the present invention has been described above in connection with specific methods and devices and with reference to a preferred embodiment, it is to be clearly understood that this description is made only by way of example and not as a limitation on the scope of the invention. For example, although the methods and apparatus of the present invention are described, in one embodiment, with reference to a LEO communication system orbiting the earth, the methods and apparatus of the present invention also could be implemented in any type of NGSO satellite communication system orbiting any celestial body. Those skilled in the art will recognize that changes and modification could be made in the preferred embodiment without departing from the scope of the present invention.

What is claimed is:

1. A satellite communication system comprising:

a nongeostationary earth orbit (NGSO) satellite;

a plurality of communication units (CUs);

means for dividing the earth into a plurality of regions, said plurality of regions having a geographical area which is selected that substantially all of said plurality of CUs within said geographical area can be handed-off as a group having more than one of said plurality of CUs;

a processor residing in said plurality of CUs, said processors capable of correlating a first group having more than one of said plurality of CUs to a first region of said plurality of regions;

means for determining a time to hand-off said first group of said plurality of CUs correlated with said first region of said plurality of regions;

means for directing handing-off of substantially all CUs of said first group of said plurality of CUs correlated in said first region of said plurality of regions at about said time to hand-off; and said means for directing hand-off of substantially all CUs of said first group resides within said at least one NGSO satellite and comprises means for sending, residing within said NGSO satellite, a single message to affect said hand-off of substantially all CUs.

2. The satellite communication system as claimed in claim 1, wherein said means for determining said time to hand-off said first group resides within said at least one NGSO satellite.

3. The satellite communication system as claimed in claim 1, wherein said means for determining said time to hand-off said first group resides within at least one network control facility (NCF).

4. The satellite communication system as claimed in claim 1, wherein said means for directing hand-off of substantially all CUs of said first group comprises one or more processors residing within said CUs of said first group, said one or more processors capable of initiating hand-off of substantially all CUs of said first group based on pre-programmed hand-off instructions.

* * * * *